United States Patent
Huang

(10) Patent No.: US 8,018,338 B2
(45) Date of Patent: Sep. 13, 2011

(54) MOTION SENSOR SYSTEM WITH MOTOR-ACTUATED DETECTION UNIT

(75) Inventor: Cheng-Hung Huang, Gueishan Township, Taoyuan County (TW)

(73) Assignee: Everspring Industry Co. Ltd., Taoyuan County (TW)

( * ) Notice: Subject to any disclaimer, the term of this patent is extended or adjusted under 35 U.S.C. 154(b) by 0 days.

(21) Appl. No.: 12/253,996

(22) Filed: Oct. 19, 2008

(65) Prior Publication Data

US 2010/0194559 A1  Aug. 5, 2010

(51) Int. Cl.
*G08B 13/00* (2006.01)
(52) U.S. Cl. .................. 340/541; 250/342; 340/567
(58) Field of Classification Search .......... 340/541, 340/565, 567, 552; 250/342, 221
See application file for complete search history.

(56) References Cited

U.S. PATENT DOCUMENTS

| | | | | |
|---|---|---|---|---|
| 4,769,545 A * | 9/1988 | Fraden | ........................ | 250/353 |
| 4,772,875 A * | 9/1988 | Maddox et al. | ................ | 340/522 |
| 4,943,712 A * | 7/1990 | Wilder | ........................ | 250/221 |
| 5,473,368 A * | 12/1995 | Hart | ............................ | 348/155 |
| 5,489,891 A * | 2/1996 | Diong et al. | ................. | 340/567 |
| 6,762,676 B2 * | 7/2004 | Teowee et al. | ............. | 340/426.1 |
| 7,183,912 B2 * | 2/2007 | Micko | ........................ | 340/545.3 |
| 7,399,970 B2 * | 7/2008 | Micko | ........................ | 250/342 |
| 2004/0169145 A1 * | 9/2004 | Micko | ........................ | 250/342 |
| 2004/0210155 A1 * | 10/2004 | Takemura et al. | ............ | 600/534 |
| 2005/0078006 A1 * | 4/2005 | Hutchins et al. | .............. | 340/561 |
| 2005/0184869 A1 * | 8/2005 | Micko | ........................ | 340/567 |
| 2007/0187605 A1 * | 8/2007 | Micko | ........................ | 250/339.04 |
| 2007/0229250 A1 * | 10/2007 | Recker et al. | ................ | 340/531 |
| 2008/0094827 A1 * | 4/2008 | Huffman | ....................... | 362/197 |
| 2008/0136914 A1 * | 6/2008 | Carlson et al. | ................ | 348/155 |
| 2008/0291036 A1 * | 11/2008 | Richmond | ..................... | 340/628 |
| 2010/0162285 A1 * | 6/2010 | Cohen et al. | ................... | 725/12 |
| 2010/0194559 A1 * | 8/2010 | Huang | ..................... | 340/539.26 |

\* cited by examiner

*Primary Examiner* — Thomas Mullen
(74) *Attorney, Agent, or Firm* — Jackson IPG PLLC; Demian K. Jackson

(57) ABSTRACT

Disclosed is a detection process performed in the detector, which is switchable between an active detection mode, where the detector actively monitors the surrounding area, and a passive detection mode. The data obtained by operation in the active detection mode for the first time are temporarily stored to serve as an initial environmental parameter. Subsequently, the detector operates primarily in the passive detection mode to determine whether or not a downstream device is to be activated, while switching intermittently from the passive detection mode to the active detection mode to thereby determine the activation or deactivation of the downstream device based on the result of comparing the detected value with the initial environmental parameter.

14 Claims, 6 Drawing Sheets

MOTION SENSOR SYSTEM WITH MOTOR-ACTUATED DETECTION UNIT

BACKGROUND OF THE INVENTION (a) Field of the Invention

The present invention relates to a detection process performed in a detector, and more particularly, to a detection process performed in a detector that is suitable for use in a residential security and automation system with improved functions.

(b) Description of the Prior Art

Pyroelectric infrared sensors have been used in the residential security and automation systems for years, rendering the systems able to activate or deactivate the switches mounted therein upon detecting a slight motion of human body in the designated areas. The so-called slight motion of human body may refer to any change in the gesture of a human object, such as shaking or nodding head, wiping nose and waving hand. Pyroelectric infrared sensors are particularly useful in the residential automation systems, since the electronic appliances placed under the management of a sensor of this type will continue to operate (for example, a continuous turning-on of a light source) as long as the human object keeps in motion during his stay within the monitored area.

However, problems may arise due to the passive operation manner of pyroelectric infrared sensors. That is to say, as a human object moves into the area monitored by a pyroelectric sensor, the infrared radiation emitted from the human object is focused by a lens array onto the sensor face and, as a result, the pyroelectric material mounted on the sensor face detects an energy change and generates a signal to place the corresponding circuits in an electrically conductive state, thereby activating the corresponding appliances. The pyroelectric sensor will nevertheless cut off the circuits on the occasion that the human object stays motionless for a period of time.

In other words, a pyroelectric sensor outputs signals only when the human object keeps in motion. While the duration of an activated lighting can be prolonged by extending the electrical conduction period of the corresponding circuits, slight motions still have to be made once in a while to keep the circuits in an electrically conductive state. For example, when a person enters a room monitored by a sensor, the sensor outputs a signal to activate lighting upon detecting the infrared energy emitted by the person in motion. If the person is motionless afterwards, the circuits for the lighting will be cut off and the lighting will be deactivated due to the incapability of the sensor to detect the presence of a motionless object. As such, the person has to make slight motions occasionally as a means to enable the sensor to detect an energy change and generate activation signals, thereby maintaining the lighting. Moreover, any strategy that involves extension of the duration of an activated lighting is undesirable in the sense of energy saving, because the lighting will last for a long period of time even after the exit of the person from the monitored area.

The conventional ways to overcome the problems mentioned above are mainly to reduce the threshold value for the signals retrieved from the sensors. While the sensitivity of a given sensor may show an increase upon decreasing the threshold value, there comes along an increased number of false actions. The crux of the invention is directed to providing an improved detection process without increasing the occurrence of false actions.

SUMMARY OF THE INVENTION

Accordingly, an object of the present invention is to provide a detection process performed in a detector that is suitable for use in a residential security and automation system with improved functions.

In order to achieve this object, the detector according to the invention comprises an active detection unit, a passive detection unit, a control unit and a memory unit. The detection process performed in the detector is switchable between an active detection mode, where the detector actively monitors the surrounding area, and a passive detection mode. The data obtained by operation in the active detection mode for the first time are temporarily stored to serve as an initial environmental parameter. Subsequently, the detector operates primarily in the passive detection mode to determine whether or not a downstream device is to be activated, while switching intermittently from the passive detection mode to the active detection mode to thereby determine the activation or deactivation of the downstream device based on the result of comparing the detected value with the initial environmental parameter.

The present invention therefore provides a detection process performed in a detector, comprising the steps of:

a. operating the detector in an active detection mode where the detector actively monitors a surrounding area to obtain a first detected value therefor, and temporarily storing the first detected value in a memory unit to serve as an initial environmental parameter;

b. switching from the active detection mode to an passive detection mode where the detector is adapted for outputting a signal for operating a downstream device upon detecting the entry of a living object into the surrounding area monitored by the detector;

c. intermittently switching from the passive detection mode to the active detection mode where the detector actively monitors the surrounding area to obtain a second detected value therefor, and comparing the second detected value with the initial environmental parameter that is temporarily stored in the memory unit, and outputting a signal for operating the downstream device when the second detected value substantially deviates from the initial environmental parameter while outputting a signal for bringing the downstream device out of operation when the second detected value does not substantially deviate from the initial environmental parameter.

BRIEF DESCRIPTION OF THE DRAWINGS

The above and other objects, features and effects of the invention will become apparent with reference to the following description of the preferred embodiments taken in conjunction with the accompanying drawings, in which.

DETAILED DESCRIPTION OF THE PREFERRED EMBODIMENTS

Figure 1:
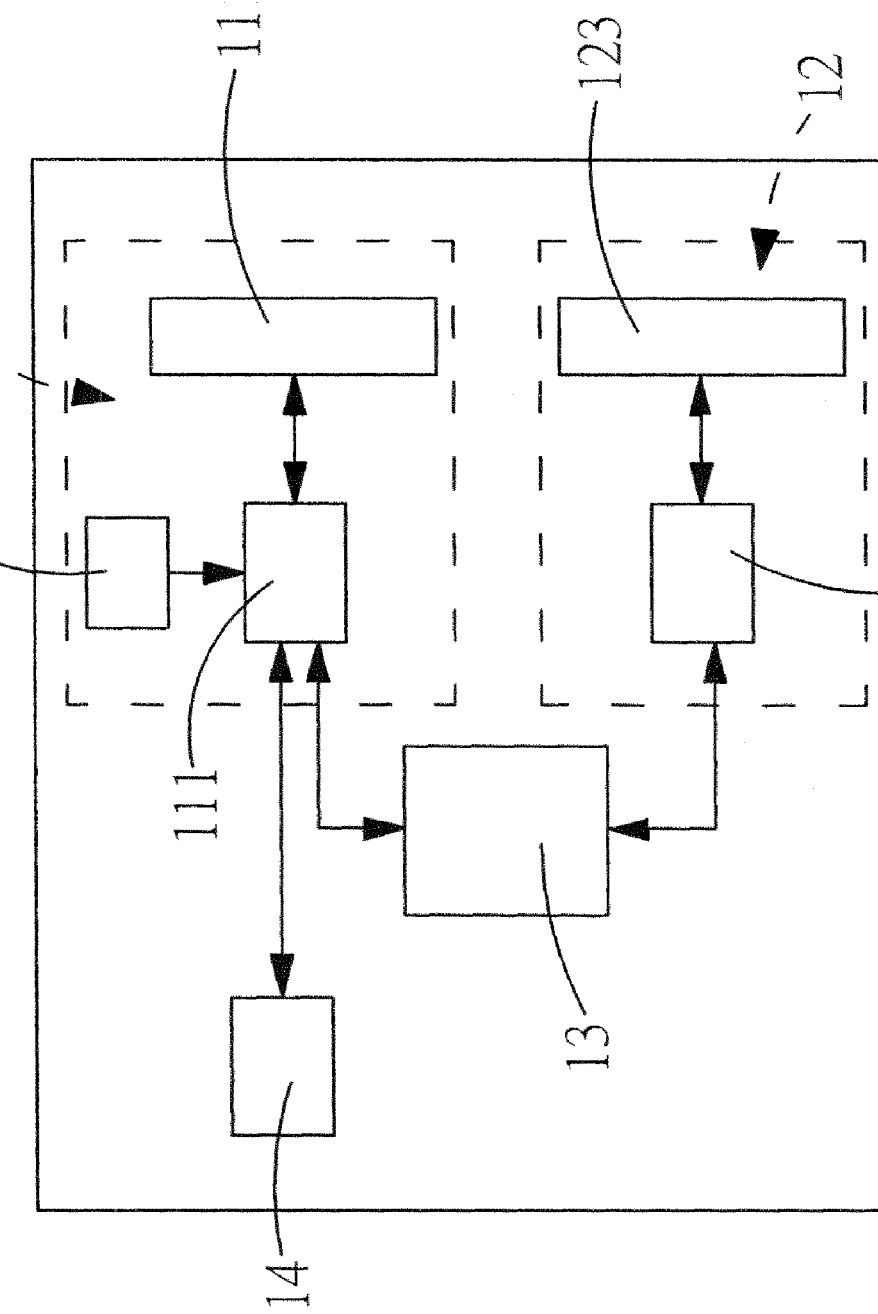
FIG. 1 is a block diagram illustrating the detector according to the invention.

Referring to FIG. 1, the detector 1 for use in the detection process according to the invention may by way of example comprise an active detection unit 11, a passive detection unit 12, a control unit 13 and a memory unit 14.

The active detection unit 11 may by way of example comprise a first sensor 111, a driving element 112 and a first lens element 113, wherein the driving element 112 is connected to the first sensor 111 in such a manner that the first sensor 111 is driven by the driving element 112. The first sensor 111 may be a pyroelectric infrared sensor. The first lens element 113 may be a plastic lens array formed by a plurality of small lenses. The driving element 112 may be a step motor arranged to drive the first sensor 111 to move, spin or rotate in relation to the objects located within the monitored area.

The passive detection unit 12 may by way of example comprise a second sensor 121 and a second lens element 122. The second sensor 121 may be a pyroelectric infrared sensor and the second lens element 122 may be a plastic lens array formed by a plurality of small lenses.

The control unit 13 is preferably connected to the active detection unit 11 and the passive detection unit 12 in such a manner that the active detection unit 11 and the passive detection unit 12 are switchably actuated by the control unit 13.

The memory unit 14 is preferably connected to the active detection unit 11.

Figure 2:
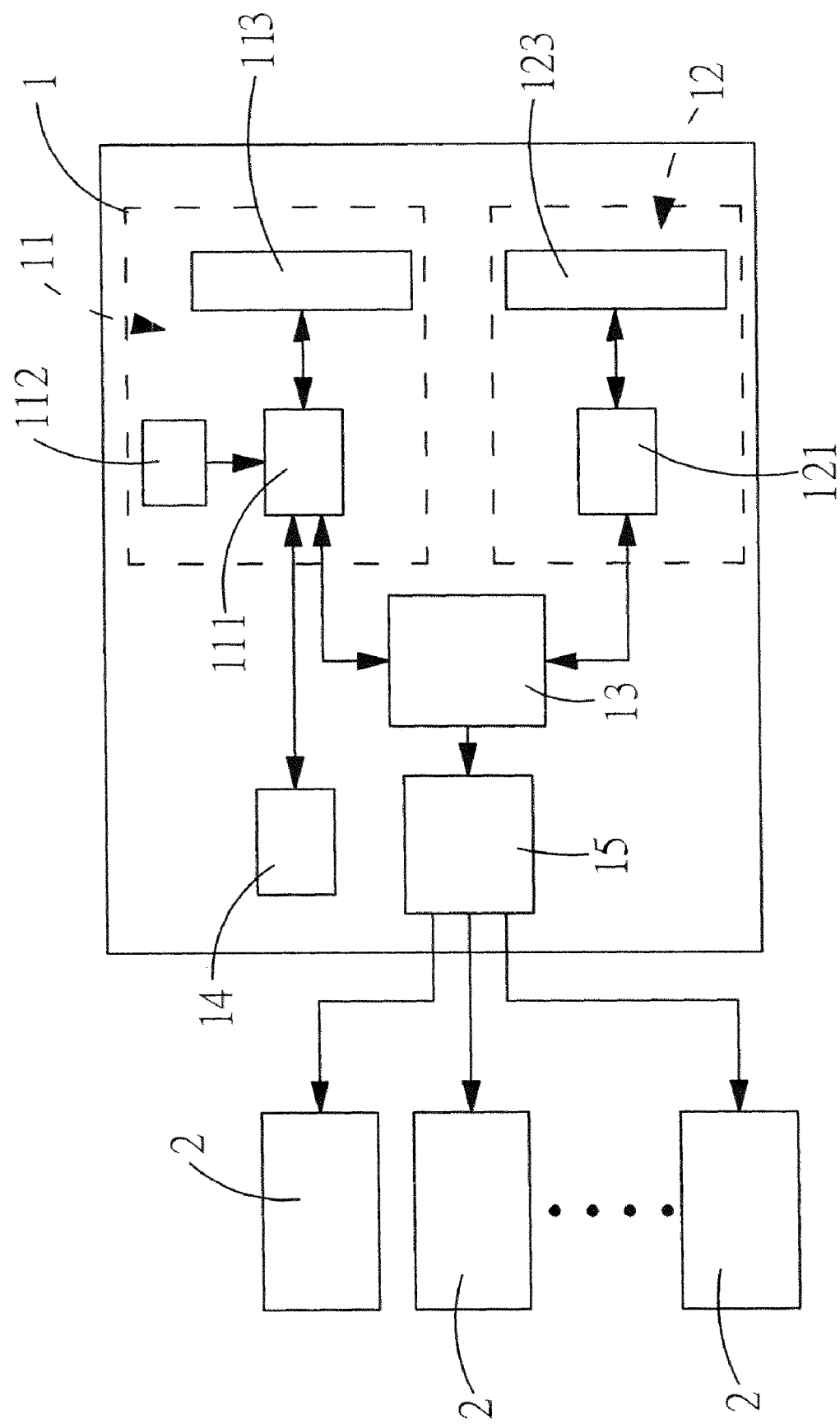
FIG. 2 is a block diagram illustrating the detector assembly according to the invention.

According to one embodiment of the invention, the detector 1 is further connected to at least one downstream device 2 to constitute a detector assembly shown in FIG. 2. The detector 1 may be additionally provided with a transmitting unit 15 which is configured to transmit signals through wired or wireless transmission channels. The transmitting unit 15 is arranged to communicate with the control unit 13 in such a manner that the signals generated by the active detection unit 11 and the passive detection unit 12 can be transmitted to the downstream device 2 through the control unit 13 and the transmitting unit 15, whereby the downstream device 2 is either triggered to operate or brought out of operation. Preferably, the downstream device 2 is selected from the group consisting of a light source, a household facility, a security system, an alert device and a mobile phone. By virtue of such an arrangement, a security and automation system for residential usage is realized using the detector assembly according to the invention.

Figure 3:
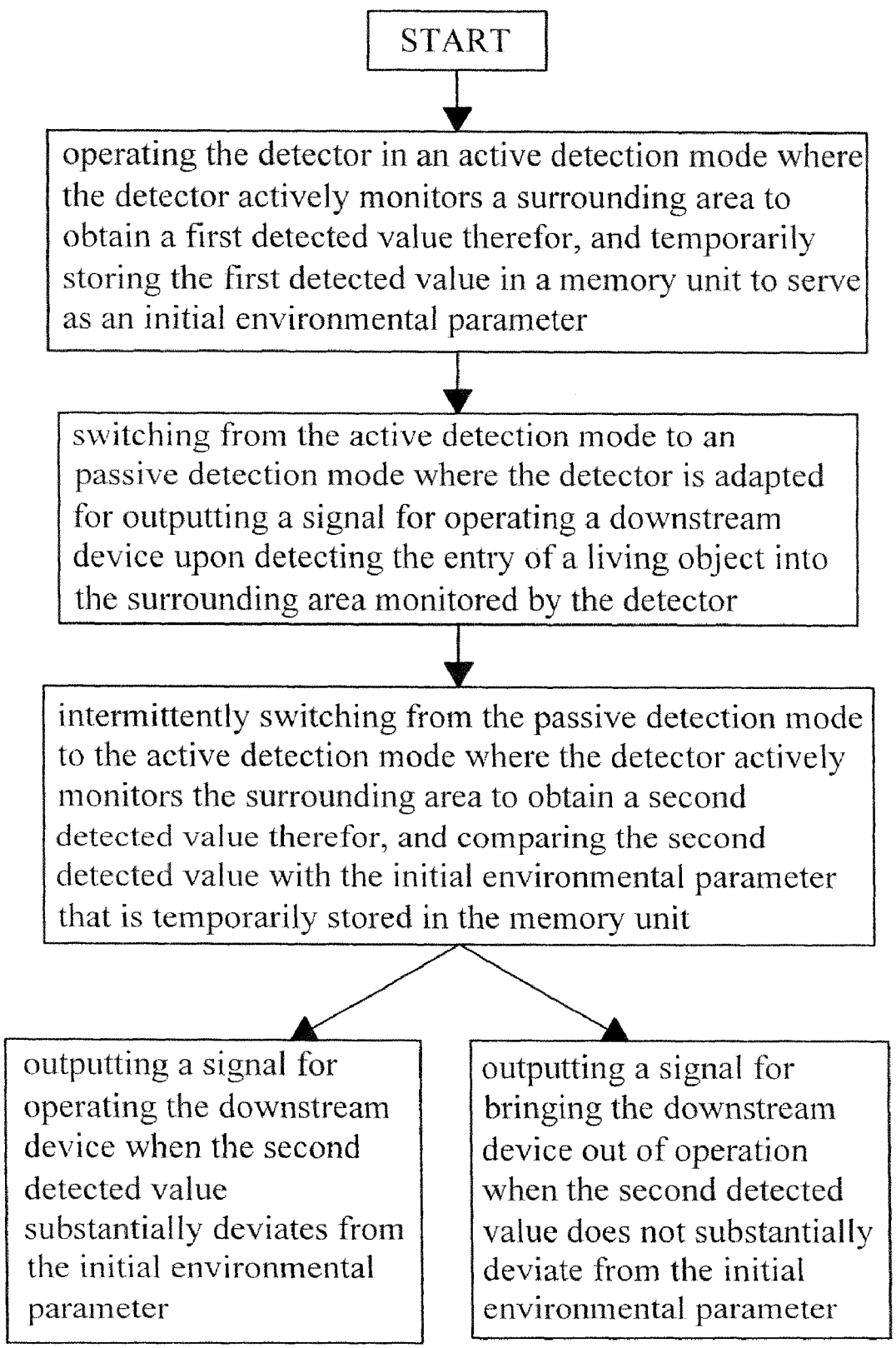
FIG. 3 is a flow chart illustrating the detection process according to the invention.

As illustrated in FIGS. 2 and 3, the detection process performed in the detector according to the invention may by way of example comprise the following steps.

Step a. The active detection unit 11 is enabled to operate in the active detection mode and actively monitor a surrounding area A where there exists no living object, such as a human object, at this point in time (see FIG. 4). The first sensor 111 receives the infrared energy that is emitted from the non-living objects 31 located within the surrounding area A and focused by the first lens element 113. The value detected thereby is temporarily stored in the memory unit 14 and serves as an initial environmental parameter.

Figure 5:
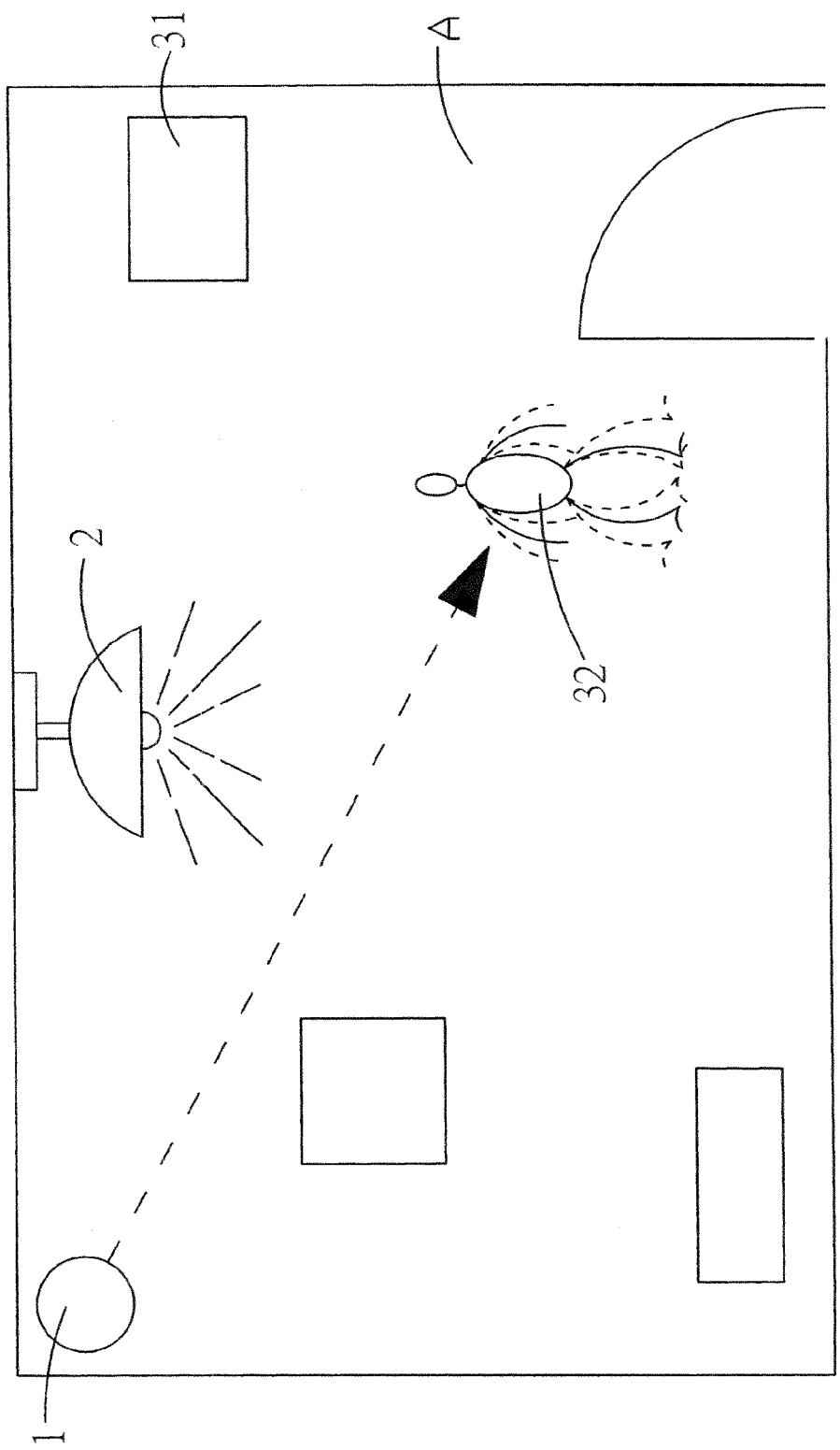
FIG. 5 is a schematic diagram illustrating the operation in the passive detection mode according to the invention.

Step b. The operation mode of the detector 1 is switched to the passive detection mode performed by the passive detection unit 12. A living object, such as a human object 32, entering the monitored surrounding area A (see FIG. 5) is detected by the second sensor 121 when the infrared energy emitted from the human object 32 is focused by the second lens element 122 onto the sensor face. As a consequence, the second sensor 121 generates a signal which is subsequently transmitted to the downstream device 2 through the control unit 13 and the transmitting unit 15, whereby the downstream device 2 is triggered to operate. The downstream device 2 may by way of example be a light source as illustrated in FIG. 5, which is turned on by this point. Likewise, as the human object 32 moves within the monitored surrounding area A, the passive detection unit 12 will be sending signals to maintain the operation of the downstream device 2 upon detecting the infrared energy radiated from the moving object.

Figure 4:
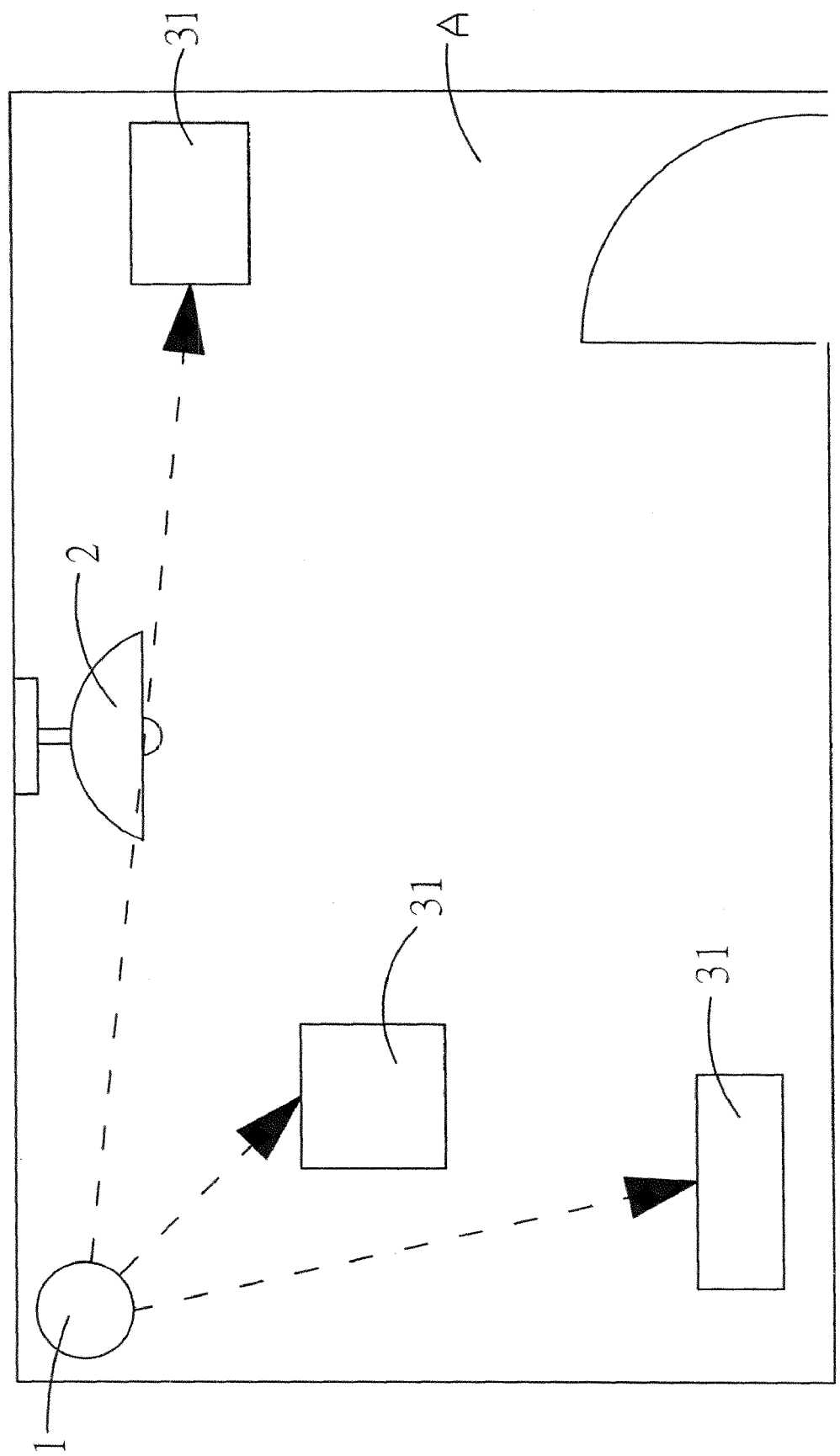
FIG. 4 is a schematic diagram illustrating the operation in the active detection mode according to the invention in the absence of a living object.
Figure 6:
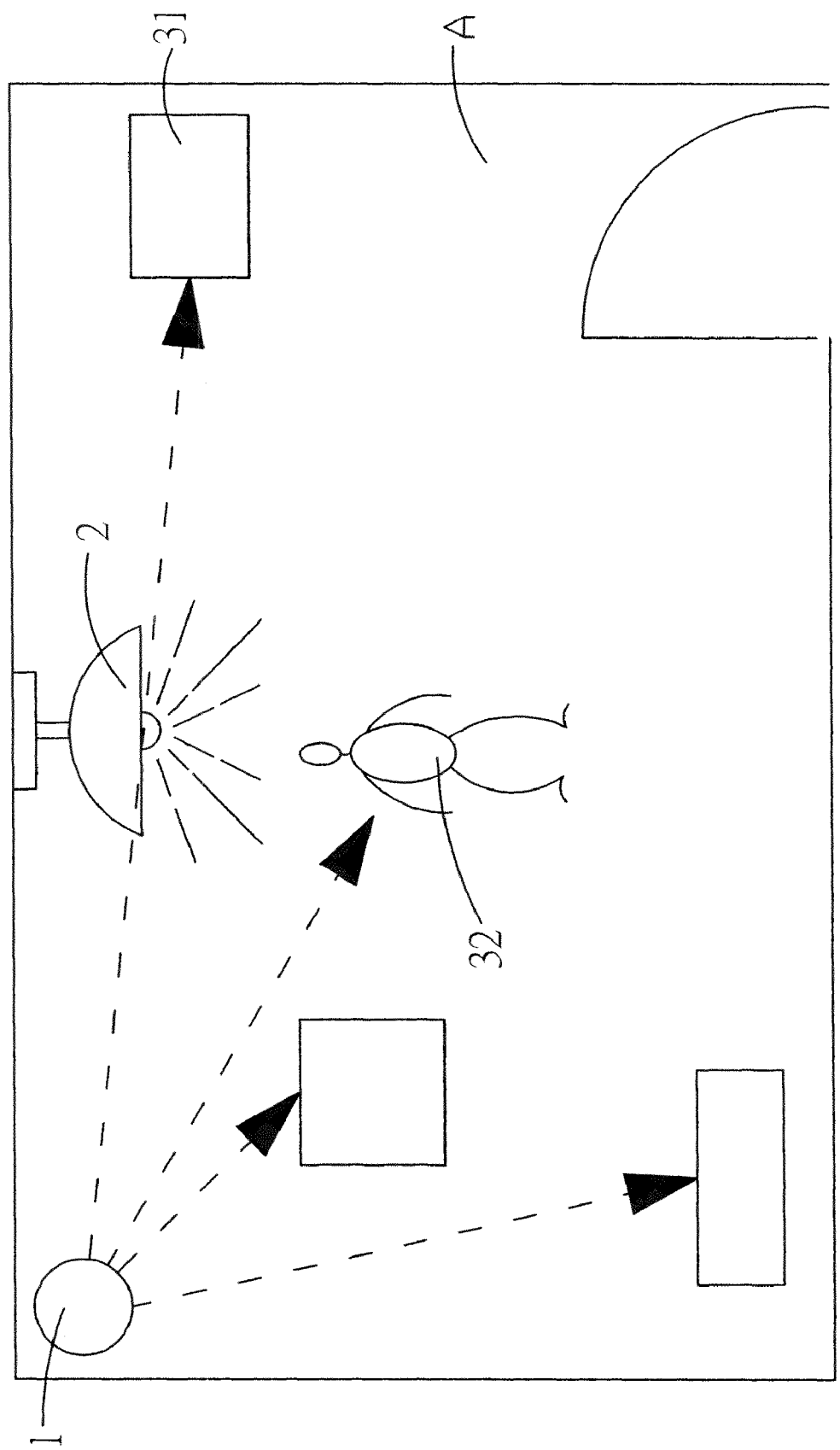
FIG. 6 is a schematic diagram illustrating the operation in the active detection mode according to the invention in the presence of a living object.

Step c. The detector 1 operates primarily in the passive detection mode while switching intermittently from the passive detection mode to the active detection mode. According to one embodiment of the invention, the intermittent operation of the active detection mode is realized by setting in the control unit 13 the amount of time that the active detection unit 11 should be running so that the active detection unit 11 is activated repeatedly at a predetermined interval. In the active detection mode, the detector actively monitors the surrounding area, and the value detected thereby is compared with the initial environmental parameter that is temporarily stored in the memory unit 14. If the human object 32 keeps motionless in the monitored surrounding area A as illustrated in FIG. 6, the detector 1 would not be able to detect the presence of the human object 32 until the operation mode thereof is temporarily switched from the passive detection mode to the active detection mode. The value detected under the active detection mode will substantially deviate from the initial environmental parameter due to the presence of the human object 32 and, as a consequence, the downstream device 2 is kept in operation. On the contrary, the active detection unit 11 will determine the absence of the human object 32 in the monitored surrounding area as illustrated in FIG. 4 if the value detected under the active detection mode does not substantially deviate from the initial environmental parameter. A signal is then output from the active detection unit 11 to bring the downstream device 2 out of operation, for example, switching a light source to the OFF state.

Accordingly, the invention enables precise control for the activation and deactivation of the downstream device, even in the occasion that the living object stays motionless in the monitored area, by enabling the active detection unit to move, spin or rotate in relation to the objects located within the monitored area to thereby operate in the active detection mode where the active detection unit actively detects the monitored area at a predetermined interval, and by comparing the detected value with the initial environmental parameter to determine if the living object is present in the monitored area. The invention is therefore free of the drawback of insensitivity to a motionless living object that occurs in the conventional detectors.

While the invention has been described with reference to the preferred embodiments above, it should be recognized that the preferred embodiments are given for the purpose of illustration only and are not intended to limit the scope of the present invent ion and that various modifications and changes, which will be apparent to those skilled in the relevant art, may be made without departing from the spirit of the invention and the scope thereof as defined in the appended claims.

What is claimed is:

1. A detection process performed in a detector, comprising the steps of:
   a. operating the detector in an active detection mode where the detector actively monitors a surrounding area to obtain a first detected value therefor, and temporarily storing the first detected value in a memory unit to serve as an initial environmental parameter;

b. switching from the active detection mode to an passive detection mode where the detector is adapted for outputting a signal for operating a downstream device upon detecting the entry of a living object into the surrounding area monitored by the detector; and c. intermittently switching from the passive detection mode to the active detection mode where the detector actively monitors the surrounding area to obtain a second detected value therefor, and comparing the second detected value with the initial environmental parameter that is temporarily stored in the memory unit, and outputting a signal for operating the downstream device when the second detected value substantially deviates from the initial environmental parameter while outputting a signal for bringing the downstream device out of operation only when the second detected value does not substantially deviate from the initial environmental parameter.

2. The detection process according to claim 1, wherein the detector comprises an active detection unit for operating the detector in the active detection mode and a passive detection unit for operating the detector in the passive detection mode.

3. The detection process according to claim 2, wherein the active detection unit comprises a first sensor, a driving element connected to the first sensor for controlling the movement of the first sensor, and a first lens element.

4. The detection process according to claim 3, wherein the first sensor is a pyroelectric infrared sensor.

5. The detection process according to claim 3, wherein the driving element is a step motor.

6. The detection process according to claim 3, wherein the first lens element is configured in the form of a plastic lens array.

7. The detection process according to claim 2, wherein the passive detection unit comprises a second sensor and a second lens element.

8. The detection process according to claim 7, wherein the second sensor is a pyroelectric infrared sensor.

9. The detection process according to claim 7, wherein the second lens element is configured in the form of a plastic lens array.

10. The detection process according to claim 1, wherein the detector further comprises a control unit for selectively actuating the detector to operate in the active detection mode and the passive detection mode.

11. The detection process according to claim 1, wherein the downstream device is selected from the group consisting of a light source, a household facility, a security system, an alert device and a mobile phone.

12. The detection process according to claim 1, wherein the step of outputting a signal comprises a step of transmitting the signal from the detector to the downstream device by use of a transmitting unit.

13. The detection process according to claim 12, wherein the step of transmitting is performed in a wireless manner.

14. The detection process according to claim 12, wherein the step of transmitting is performed in a wired manner.

* * * * *